US010562518B2

(12) United States Patent
Kang et al.

(10) Patent No.: US 10,562,518 B2
(45) Date of Patent: Feb. 18, 2020

(54) APPARATUS AND METHOD FOR CONTROLLING A POWERTRAIN IN A VEHICLE

(71) Applicants: HYUNDAI MOTOR COMPANY, Seoul (KR); KIA Motors Corporation, Seoul (KR)

(72) Inventors: Ji Hoon Kang, Seoul (KR); Jea Mun Lee, Seoul (KR); Chun Hyuk Lee, Suwon-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 59 days.

(21) Appl. No.: 15/835,639

(22) Filed: Dec. 8, 2017

(65) Prior Publication Data

US 2018/0290647 A1  Oct. 11, 2018

(30) Foreign Application Priority Data

Apr. 5, 2017  (KR) .................. 10-2017-0044016

(51) Int. Cl.
| | |
|---|---|
| *B60W 20/40* | (2016.01) |
| *B60W 20/20* | (2016.01) |
| *B60W 20/10* | (2016.01) |
| *B60W 10/113* | (2012.01) |
| *B60W 30/18* | (2012.01) |
| *B60W 10/06* | (2006.01) |
| *B60W 10/08* | (2006.01) |

(Continued)

(52) U.S. Cl.
CPC ............ *B60W 20/20* (2013.01); *B60W 10/02* (2013.01); *B60W 10/06* (2013.01); *B60W 10/08* (2013.01); *B60W 10/11* (2013.01); *B60W 10/113* (2013.01); *B60W 20/10* (2013.01); *B60W 20/40* (2013.01); *B60W 30/18027* (2013.01); *B60W 2510/0638* (2013.01); *B60W 2510/081* (2013.01); *B60W 2510/244* (2013.01); *B60W 2520/10* (2013.01); *B60W 2540/10* (2013.01); *Y10T 477/26* (2015.01); *Y10T 477/675* (2015.01)

(58) Field of Classification Search
CPC ...... B60W 10/02; B60W 10/11; B60W 10/08; B60W 10/06; B60W 20/40; B60W 30/18027; B60W 20/10; B60W 2540/10; B60W 2520/10; B60W 2510/244; B60W 2510/081; B60W 2510/0638; Y10T 477/26; Y10T 477/675
See application file for complete search history.

(56) References Cited

U.S. PATENT DOCUMENTS

2007/0056783 A1*  3/2007  Joe ..................... B60K 6/48
                                                    180/65.265
2009/0308673 A1*  12/2009  Seel ................... B60K 6/48
                                                    180/65.22
(Continued)

*Primary Examiner* — Roger L Pang
(74) *Attorney, Agent, or Firm* — McDonnell Boehnen Hulbert & Berghoff LLP (57) ABSTRACT

A method of controlling a powertrain in a hybrid vehicle includes driving a drive motor through a power supply device including electric energy, recognizing when drive power of an engine is necessary, comparing a speed of the drive motor with a predicted output of the engine, and determining whether to start the engine and couple the engine clutch according to a result of the comparison.

10 Claims, 8 Drawing Sheets

(51) Int. Cl.
    *B60W 10/02*    (2006.01)
    *B60W 10/11*    (2012.01)

(56) References Cited

U.S. PATENT DOCUMENTS

| | | | |
|---|---|---|---|
| 2010/0204005 A1* | 8/2010 | Kaltenbach | B60K 6/48 |
| | | | 477/5 |
| 2013/0184922 A1* | 7/2013 | Kabe | B60L 15/20 |
| | | | 701/22 |
| 2013/0296109 A1* | 11/2013 | Nedorezov | B60W 10/06 |
| | | | 477/5 |
| 2018/0208202 A1* | 7/2018 | Kobayashi | B60K 6/48 |
| 2018/0244263 A1* | 8/2018 | Bower | B60W 20/40 |

* cited by examiner

FIG.8

APPARATUS AND METHOD FOR CONTROLLING A POWERTRAIN IN A VEHICLE

CROSS-REFERENCE TO RELATED APPLICATION

This application claims the benefit of Korean Patent Application No. 10-2017-0044016, filed on Apr. 5, 2017, the entire contents of which is fully incorporated by reference herein.

BACKGROUND

Field

The present disclosure relates to a method and apparatus for controlling a powertrain in a vehicle and, more particularly, to an apparatus and method for controlling a powertrain in a vehicle including a plurality of power sources.

Discussion of the Related Art

A hybrid vehicle generally refers to a vehicle driven by efficiently combining two or more types of power sources and, in most cases, includes a vehicle including an engine for obtaining drive power by combusting fuel (fossil fuel such as gasoline) and an electric motor for obtaining drive power using electric power of a battery.

The hybrid vehicle may be formed in various ways by using the engine and the electric motor as the power source. For example, a vehicle that directly transfers mechanical power of the engine to wheels and is assisted by using the electric motor driven by electric power of the battery if necessary is called a parallel hybrid vehicle. A vehicle that converts the mechanical power of the engine into electric power through a generator to drive the electric motor or to charge the electric power in the battery is called a serial hybrid vehicle.

In the parallel hybrid vehicle, the engine and the motor are connected to each other by an engine clutch, a dual clutch is connected to the shafts of the motor and the engine, and a gearshift is connected to the dual clutch. The parallel hybrid vehicle has an EV mode in which the engine clutch is not coupled and the hybrid vehicle is driven by only the motor, an HEV mode in which the engine clutch is coupled and both the engine and the motor are driven, and a slip driving mode in which the engine clutch is not completely coupled in the HEV mode and a torque of the engine is transferred while rotation speeds of the engine and the motor are different from each other.

In the HEV mode, when an input speed input to the gearshift as a sum of output torques of the engine and the motor by coupling the engine clutch is smaller than an idle rotation speed of the engine, in order to transfer drive power of the engine to the gearshift, the engine clutch is controlled to be in a slip state. In order to transfer a target engine torque, a hydraulic flow of the engine clutch is controlled.

Generally, the hybrid vehicle uses electric energy upon initial acceleration. However, acceleration using only electric energy has some limits and thus the engine may be temporally used as a main power source. When the engine is used as the main power source at a gear shifting time, the engine clutch is not used as the power source and then the engine clutch is coupled again in order for the engine to be used as the power source after shifting gears.

SUMMARY

Accordingly, the present disclosure is directed to a method and apparatus for controlling a powertrain in a vehicle that substantially obviates one or more problems due to limitations and disadvantages of the related art.

An object of the present disclosure is to provide a method and apparatus capable of improving fuel efficiency by driving a motor using electric energy as a power source while a hybrid vehicle travels at a low speed after startup and then driving an engine and coupling an engine clutch after shifting gears when an engine using a fossil fuel needs to be driven.

Another object of the present disclosure is to provide a method and apparatus capable of adjusting a time when an engine clutch is coupled while cranking the engine from a time when drive power of the engine using fossil fuel is necessary, in a hybrid vehicle.

Another object of the present disclosure is to provide a method and apparatus which do not drive an engine when drive power of the engine is determined to be necessary, but drive the engine when gear shifting control for moving the vehicle is completed, and couple an engine clutch for transferring the drive power of the engine, in a hybrid vehicle.

The technical problems solved by the present disclosure are not limited to the above technical problems and other technical problems which are not described herein will become apparent to those skilled in the art from the following description.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a method of controlling a powertrain in a hybrid vehicle including driving a drive motor through a power supply device using electric energy, recognizing when drive power of an engine is necessary, comparing a speed of the drive motor with predicted output of the engine, and determining whether to start the engine and couple the engine clutch according to a result of the comparison is disclosed.

The hybrid vehicle may include at least one of a serial hybrid system, a parallel hybrid system, or a combined hybrid system mounted therein.

The power supply device may operate while a travel speed of the vehicle is in a predetermined range after the vehicle starts up.

The power supply device may include a battery configured to store electric energy and a regenerative braking device configured to charge the battery.

The drive power of the engine may be necessary when at least one of a state in which a charging state of a battery is less than a threshold, a discharge restriction state due to a low temperature, or a state in which a manipulation value set in a power supply device exceeds a reference value is satisfied.

A time when the drive power of the engine is necessary may correspond to output of an accelerator pedal sensor.

Predicted output of the engine may be obtained by subtracting a first speed, which is actually increased until a coupling time, from a second speed of the driving motor, which is predicted at the coupling time of the engine clutch.

The method may further include predicting a gear shifting period according to an automatic gear shifting pattern and determining whether to start the engine and couple the engine clutch when the gear shifting period ends.

The predicting of the gear shifting period may include calculating a gear shifting start time and a gear shifting end time through a gear shifting pattern map having an automatic gear shifting pattern set while the vehicle travels.

A computer-readable recording medium according to another embodiment of the present disclosure may have a program recorded thereon for executing the method of controlling the powertrain in the hybrid vehicle through a processor.

According to another aspect of the present disclosure, a method of controlling a powertrain in a hybrid vehicle includes driving a drive motor through a power supply device including electric energy, recognizing when drive power of an engine is necessary, checking a gear shifting time based on an automatic gear shifting pattern, and starting the engine and coupling an engine clutch when the gear shifting time ends.

The starting of the engine and the coupling of the engine clutch may include starting the engine when the gear shifting time ends, comparing a speed of the drive motor with a predicted output of the engine, and determining start of the engine and coupling of the engine clutch according to a result of the comparison.

The predicted output of the engine may be obtained by subtracting a first speed, which is actually increased until a coupling time, from a second speed of the driving motor, which is predicted at the coupling time of the engine clutch.

The drive power of the engine may be necessary when at least one of a state in which a charging state of a battery is less than a threshold, a discharge restriction state due to a low temperature, or a state in which a manipulation value set in a power supply device exceeds a reference value is satisfied.

According to another aspect of the present disclosure, a hybrid vehicle includes a gearshift configured to adjust kinematic energy supplied to an axle, a drive motor configured to supply drive power to the gearshift, a first powertrain configured to drive the drive motor using fossil fuel a second powertrain configured to drive the drive motor using electric energy stored in a battery, and a vehicle controller configured to control the second powertrain and the first powertrain to be selectively connected to the drive motor. The vehicle controller couples the first powertrain to the drive motor when a gear shifting period of the gearshift ends while the vehicle travels using the second powertrain.

The gear shifting period of the gearshift may be from a gear shifting start time to a gear shifting end time predicted through a gear shifting pattern map having an automatic gearshift pattern set while the vehicle travels.

The vehicle controller may drive the drive motor through the second powertrain, recognize when drive power of an engine is necessary and compare a speed of the drive motor with a predicted output of the engine, and determine whether to start the engine included in the first powertrain and couple the engine clutch according to a result of the comparison.

The predicted output of the engine may be obtained by subtracting a first speed, which is actually increased until a coupling time, from a second speed of the driving motor, which is predicted at the coupling time of the engine clutch.

The vehicle controller may drive a drive motor through the second powertrain, check a gear shifting time based on an automatic gear shifting pattern after recognizing when drive power of an engine is necessary, and start the engine included in the first powertrain and couple an engine clutch when the gear shifting time ends.

In order to start the engine and to couple the engine clutch, the vehicle controller may start the engine when the gear shifting time ends, compare a speed of the second powertrain with predicted output of the engine and determine start of the engine and coupling of the engine clutch according to a result of the comparison.

The drive power of the engine may be necessary when at least one of a state in which a charging state of a battery is less than a threshold, a discharge restriction state due to a low temperature, or a state in which a manipulation value set in a power supply device exceeds a reference value is satisfied.

The aspects are only a part of the preferred embodiments of the present disclosure, and various embodiments based on technical features of the present disclosure may be devised and understood by a person with ordinary skill in the art based on the detailed description.

BRIEF DESCRIPTION OF THE DRAWINGS

Exemplary aspects are illustrated in the drawings. It is intended that the embodiments and figures disclosed herein are to be considered illustrative rather than restrictive.

DETAILED DESCRIPTION

Hereinafter, an apparatus and various methods, to which the embodiments of the present disclosure are applied, will be described in detail with reference to the accompanying drawings. The suffixes "module" and "unit" of elements herein are used for convenience of description and thus can be used interchangeably and do not have any distinguishable meanings or functions.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction or a downward direction of the element.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as "being connected to", "being coupled to", or "accessing" another element, one element may "be connected to", "be coupled to", or "access" another element via a further element although one element may be directly connected to or may directly access another element.

Figure 1:
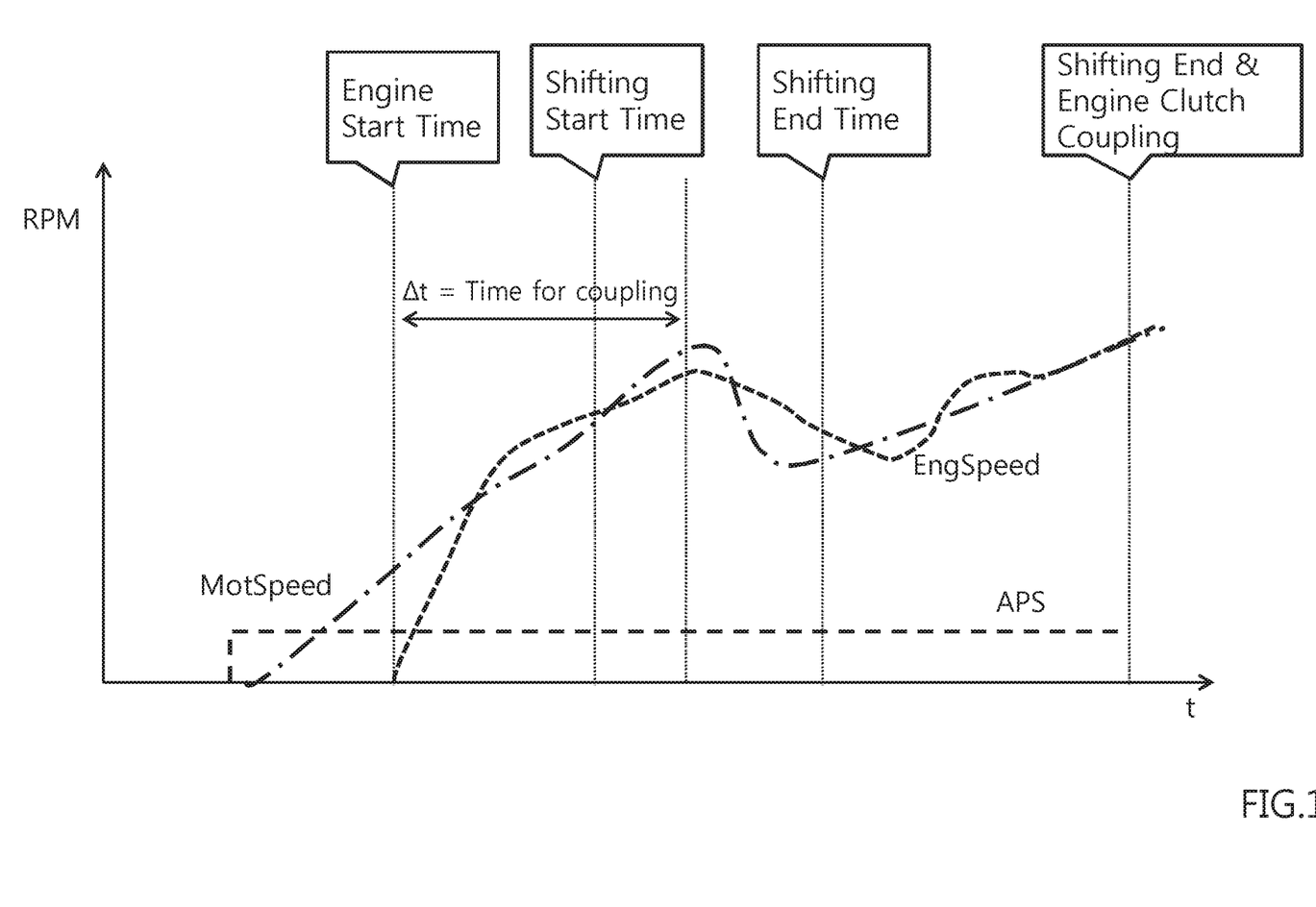
FIG. 1 is a diagram illustrating engine clutch connection in a hybrid vehicle.

FIG. 1 is a diagram illustrating engine clutch connection in a hybrid vehicle. As shown, the hybrid vehicle may start to travel by driving a drive motor by electric energy. A speed MotSpeed of the drive motor driven by electric energy may increase from the start of traveling in a low-speed period. The hybrid vehicle may include at least two power sources, for example, an engine using fossil fuel (gasoline) and a battery for storing electric energy. For convenience of description, the hybrid vehicle may include a first powertrain including an engine using fossil fuel and a second powertrain using electric energy.

The second powertrain may be used from the start of traveling to a time when drive power output from the first powertrain is transferred to the drive motor. When a predetermined time elapses after the hybrid vehicle starts to travel using the second powertrain, drive power may need to be received from the first powertrain. At this time, the engine included in the first powertrain may start.

After the vehicle starts up or while the vehicle travels, a user or a driver may press an accelerator pedal in order to increase the speed. This may be sensed through an accelerator pedal position (APP) sensor or an accelerator position sensor (APS). Here, assume that the user or the driver may press the accelerator pedal at a constant level.

When a predetermined time elapses after the user presses the accelerator pedal, it may be determined that drive power of the engine is necessary. Upon determining that drive power of the engine is necessary, in order to link the engine with the drive motor operating by electric energy after the engine starts up, a coupling time Δt may be necessary. Such a coupling time Δt is necessary for cranking. Cranking refers to a state in which the engine is not driven by power thereof but is rotated by a starter motor, and the term originated from hand-cranked engines used in the past. The engine may have loads such as resistance by inertial force, resistance by compression pressure, frictional resistance, etc. To this end, a cranking period, that is, the coupling time Δt, may be present.

For example, the drive power being received from the first powertrain means that the speed of the hybrid vehicle may increase. Change in speed of the hybrid vehicle adjusts kinetic energy transferred from a gearshift to an axle. The axle and the drive motor may be temporarily separated when the gearshift shifts gears. For fuel efficiency, the engine does not need to operate in the gear shifting period of the gearshift.

As the speed of the hybrid vehicle increases, since it is difficult to provide drive power required to maintain or increase the speed using only the second powertrain, the engine of the first powertrain needs to start. As described above, the hybrid vehicle may start to travel using the drive motor linked with the second powertrain, and, even though the engine starts upon determining that the drive power of the first powertrain including the engine is necessary, the coupling time Δt may be required to transfer the drive power of the engine to the drive motor.

If the gearshift shifts gears in order to change the speed of the hybrid vehicle when the coupling time Δt has elapsed after the engine starts, because of the drive power of the engine and then the engine and the drive motor are linked (that is, from a gear shifting start time to a gear shifting end time), the engine clutch cannot connect the engine to the drive motor until gear shifting ends. Thereafter, if the gear shifting period ends and the speed EngSpeed of the drive motor by the drive power of the engine is greater than the speed MotSpeed of the drive motor by electric energy, the engine clutch may link the engine to the drive motor.

Referring to FIG. 1, the engine operates from the engine start time to a time when the engine clutch is coupled due to the speed EngSpeed of the drive motor by the drive power of the engine greater than the speed MotSpeed of the drive motor by electric energy. However, the engine is not actually connected to the drive motor, such that operation of the engine may reduce energy efficiency (that is, fuel efficiency).

Figure 2:
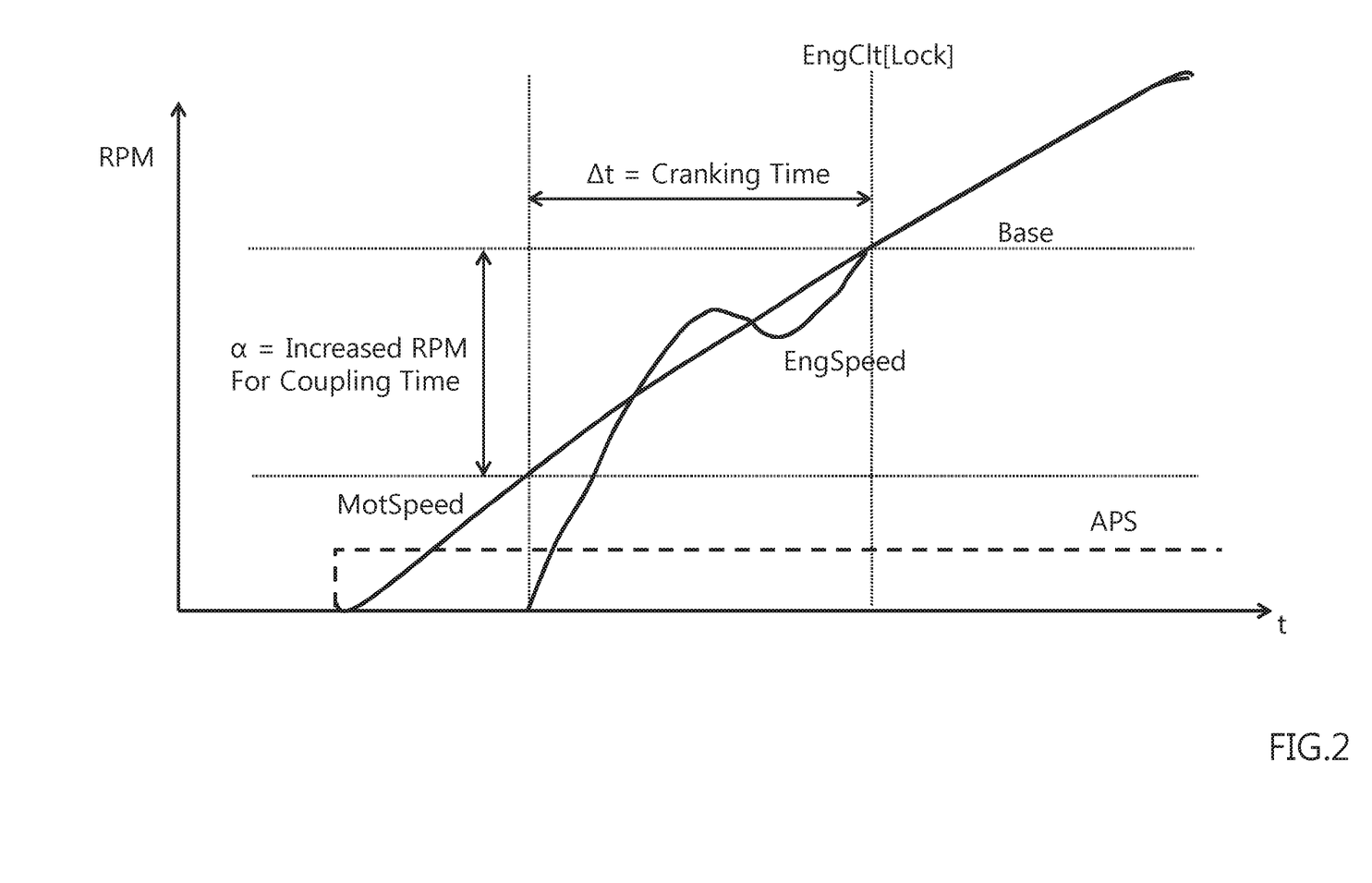
FIG. 2 is a diagram illustrating an engine clutch operation time.

FIG. 2 is a diagram illustrating an engine clutch operation time. As shown, in order to prevent fuel loss generated in the above-described process and determine an operation time of the engine clutch, whether gear shifting is performed (e.g., when the engine clutch is coupled (EngClt[Lock])) may be determined using the time Δt from the present time to a time when the engine is actually used as a power source and change α in motor speed. For example, a time when the speed of the drive motor by the drive power of the engine becomes greater than the speed of the drive motor by the second powertrain may be determined as a time when the engine clutch is coupled (EngClt[Lock]), through the cranking time Δt from startup of the engine and change α in motor speed.

Figure 3:
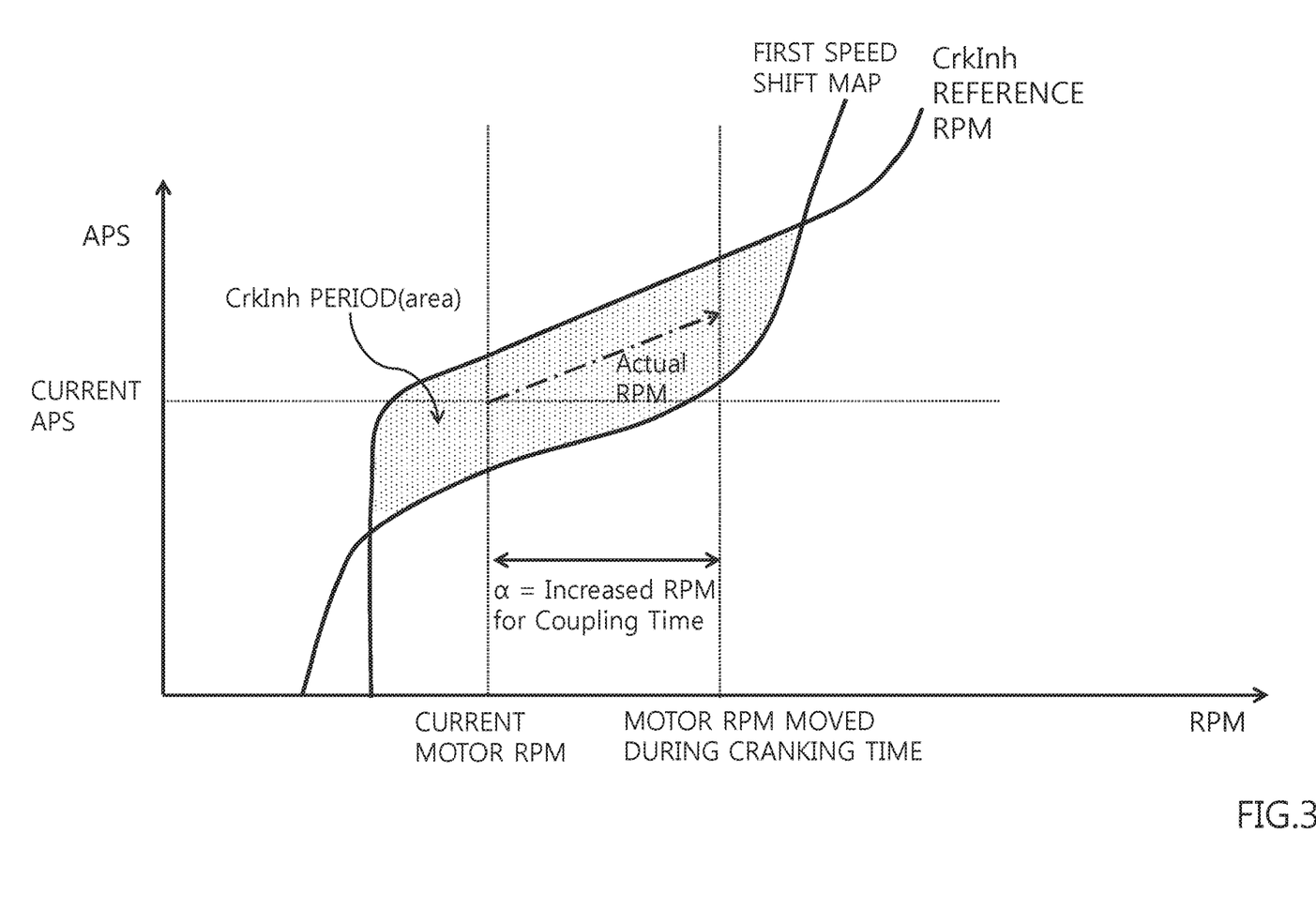
FIG. 3 is a diagram illustrating an engine clutch coupling time in a hybrid vehicle.

FIG. 3 is a diagram illustrating an engine clutch coupling time in a hybrid vehicle. As shown, engine cranking and gear shifting of the hybrid vehicle is described using revolutions per minute (RPM) and output of an APS. First, in the gearshift of the vehicle or a controller for controlling the gearshift, the RPM and the APS value are set according to an automatic gear shifting pattern (e.g., a first speed shift map). In addition, in the traveling hybrid vehicle, the RPM of the drive motor is not changed until the output of the APS reaches a predetermined level (e.g., the current APS) and is significantly increased as the output of the APS increases if the APS exceeds the predetermined level. At this time, gear shifting control may be necessary. While gear shifting control is performed according to a criterion stored in the gear shifting map set in the gear shifting controller, cranking ends in the cranking period (e.g., CrkInh period) after the engine starts and the RPM of the drive motor is continuously increased while the engine clutch is coupled. That is, it can be seen that fuel loss occurs until the engine clutch is coupled after the engine start.

In the hybrid vehicle, there is a difference between a time when the drive power of the engine is necessary and a gear shifting time when the drive power of the engine is actually applied. At this time, the RPM of the drive motor may be increased. Therefore, the speed of the drive motor by the drive power of the engine may not reach a desired level. For example, the speed of the drive motor by the drive power of the engine may not be uniformly increased or decreased, but may be increased or decreased for a long period time while repeatedly being increased or decreased for a short period time by operation of the engine clutch, the internal state of the engine, an operating environment, etc.

Accordingly, whether gears are shifted and then the engine is turned on or the power source is turned on and then gears are shifted is determined using a time required to start the motor and change in motor speed, such that fuel is prevented from being consumed when the engine is not used, thereby increasing fuel efficiency. In particular, in one embodiment, whether gears are shifted and then the engine clutch is coupled (the engine is turned on to lock the engine clutch such that the engine is used as a power source) or the engine clutch is coupled and then gears are shifted may be predetermined, thereby reducing fuel loss of the engine and increasing the fuel efficiency of the vehicle.

Figure 4:
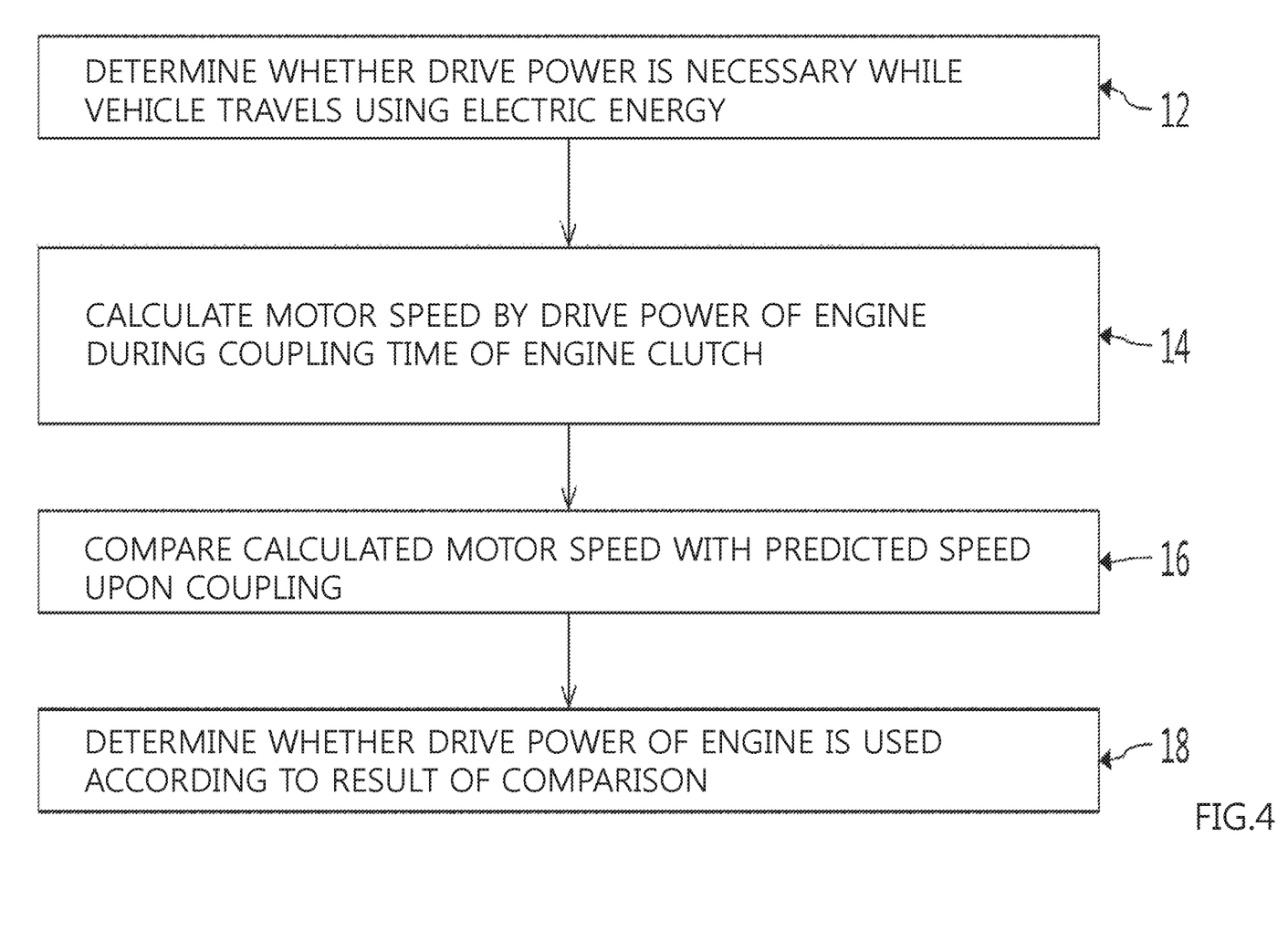
FIG. 4 is a flowchart illustrating a first method of controlling a powertrain in a hybrid vehicle.

FIG. 4 is a flowchart illustrating a first method of controlling a powertrain in a hybrid vehicle. As shown, the method of controlling the powertrain in the hybrid vehicle may include determining whether the drive power of the engine is necessary while the vehicle travels by electric energy at step 12, calculating a motor speed while the engine clutch is coupled at step 14, comparing the calculated motor speed with a predicted speed upon coupling at step 16, and determining whether the drive power of the engine is used according to the result of the comparison at step 18.

Here, whether the drive power of the engine is used may be related to the starting of the engine and the coupling of the engine clutch. In the hybrid vehicle, a time when the engine starts while the hybrid vehicle travels using electric energy stored in the vehicle, and a time when the engine clutch for transferring the drive power of the engine to the drive motor of the vehicle is coupled may be important elements for improving fuel efficiency of the vehicle.

In order to improve fuel efficiency of the hybrid vehicle, use of electric energy stored in the battery of the vehicle can be increased, and starting and driving of the engine can be decreased. However, in the hybrid vehicle, driving the vehicle using only electric energy has some limits. That is, there are various cases in which the drive power of the engine is necessary to control the powertrain of the hybrid vehicle. For example, the drive power of the engine may be necessary when at least one of a state in which the charging state of the battery is less than a threshold, a discharge restriction state due to a low temperature, or a state in which a manipulation value set in a power supply device exceeds a reference value is satisfied. In addition, the time when the drive power of the engine is necessary may correspond to output of an accelerator pedal sensor.

Upon determining that the drive power of the engine is necessary, increment in the speed of the motor by the drive power of the engine while the engine clutch is coupled (that is, during the engine cranking period) after the engine starts should be calculated. For example, based on increment in the rotation speed of the motor during the engine cranking period after the engine starts, the rotation speed of the motor when the engine clutch is coupled may be calculated.

If the speed of the drive motor by the drive power of the engine is greater than that of the drive motor by electric energy when the engine clutch is coupled, inconvenience of the user or the driver when the engine clutch is coupled may be reduced. To this end, how the speed of the drive motor is changed when the engine clutch is coupled can be predicted or calculated. Since the user or the driver presses an accelerator pedal even during the engine cranking period, the drive motor driven by electric energy may not maintain the same rotation speed. That is, the hybrid vehicle may not maintain the same speed during the engine cranking period. Accordingly, increment in the speed of the drive motor during the engine cranking period (predetermined time) may be determined before the engine clutch is coupled.

Increment in the rotation speed of the drive motor in the engine cranking period (time) after the engine starts may be determined by design variables of the hybrid vehicle, variables of a traveling environment, etc. Accordingly, a vehicle controller may predict the state when the engine clutch is coupled using such variables and determine whether the drive power of the engine is used. Here, whether the drive power of the engine is used may include determination as to when the engine starts or when the engine clutch is coupled.

Figure 5:
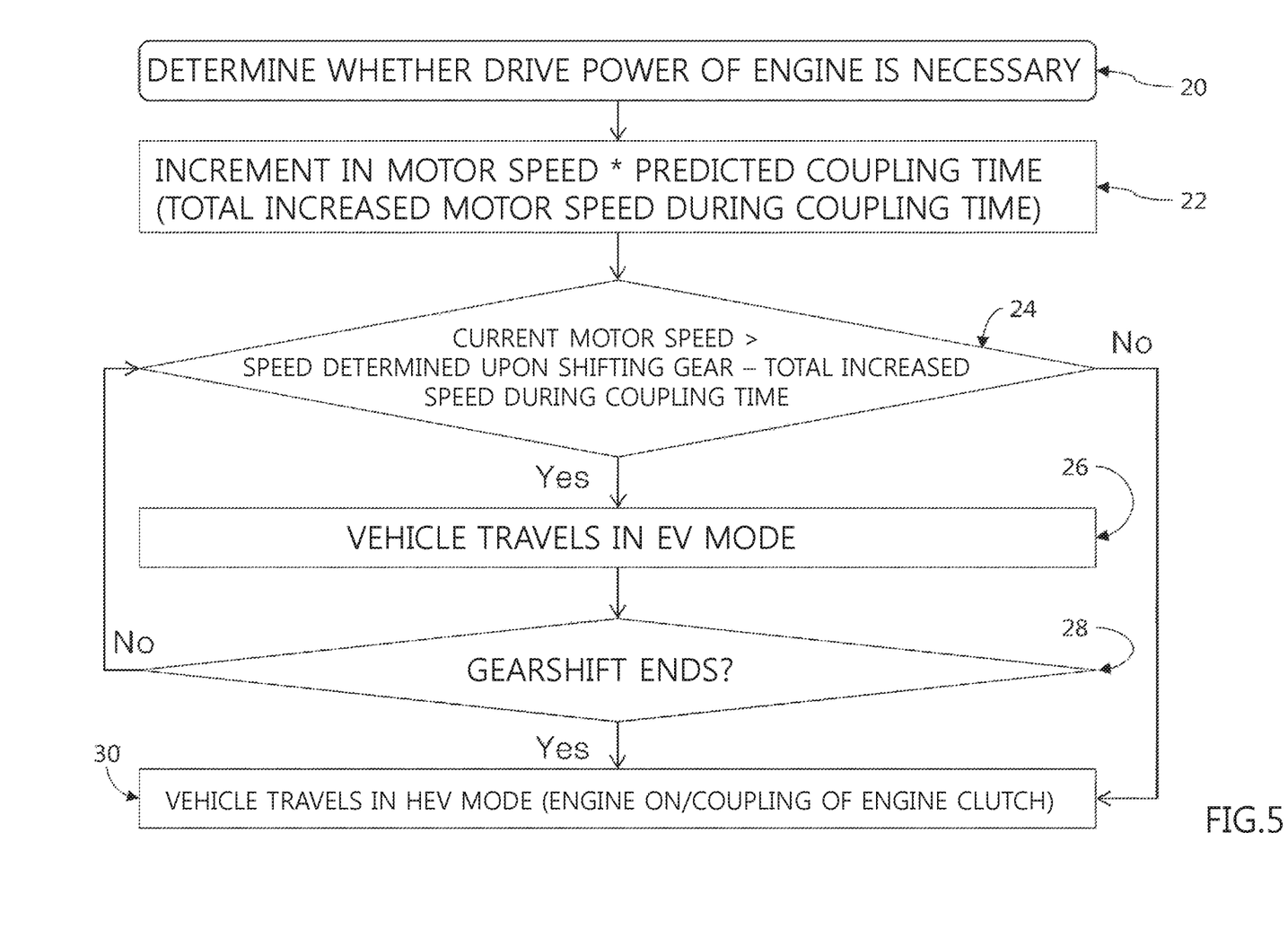
FIG. 5 is a flowchart illustrating a second method of controlling a powertrain in a hybrid vehicle.

FIG. 5 is a flowchart illustrating a second method of controlling a powertrain in a hybrid vehicle.

As shown, the method of controlling the powertrain in the hybrid vehicle may include determining whether drive power of an engine is necessary at step 20, recognizing increment in motor speed and a predicted coupling time of an engine clutch at step 22, and comparing a current motor speed with a value obtained by subtracting total increased speed until the engine clutch is coupled from a speed determined upon shifting gear at step 24.

If the current motor speed is greater than the value as the result of comparison ("Yes" of step 24), the hybrid vehicle may continuously be in a mode in which the hybrid vehicle is driven by electric energy (EV mode). Thereafter, when gear shifting ends ("Yes" of step 28), the hybrid vehicle may be driven in an HEV mode in which the engine clutch is coupled after the engine starts at step 30.

In addition, If the current motor speed is less than the value as the result of comparison ("No" of step 24), since the user or the driver does not feel uncomfortable even when the engine starts and the engine clutch is coupled, the hybrid vehicle may be driven in the HEV mode in which the engine clutch is coupled after the engine starts at step 30.

Meanwhile, if gear shifting does not end ("No" of step 28), the current motor speed may be compared with the value obtained by subtracting total increased speed until the engine clutch is coupled from the speed determined upon gear shifting again.

As described above, in the hybrid vehicle, gear shifting control may be referred to upon determining start of the engine and coupling of the engine clutch. The gearshift included in the hybrid vehicle may include a plurality of shift stages. Since the gearshift may include a plurality of shift stages, upon cruise control, the kinematic performance of the vehicle may not be negatively influenced while maximally decreasing the RPM. That is, a plurality of shift stages may be included in order to finely control an enlarged gear ratio range while decreasing the gear ratio of a maximum shift stage of the gearshift in order to increase fuel efficiency. The gearshift may variously control the RPM of the engine according to traveling conditions and, as a result, may be designed to improve fuel efficiency (by 5% to 10%), and to reduce noise and increase acceleration performance.

Meanwhile, while the gearshift included in the vehicle performs gear shifting control, for example, while the gearshift is changed from a low stage to a high stage or from a high stage to a low stage, the drive power of the engine may not be substantially transferred to the drive motor. That is, during gear shifting control, even when the engine starts, since the drive power of the engine is not transferred, fuel may be wasted. Therefore, gear shifting control according to an automatic gear shifting pattern and a gear shifting period may be considered when the engine starting time or the engine clutch coupling time are determined in the hybrid vehicle.

As described above, in order to prevent fuel from being unnecessarily consumed by predicting the coupling speed of the engine and the motor and comparing the coupling speed with the gear shifting time, a motor speed predicted upon coupling may be determined using change in motor speed and a time required for coupling. In addition, the motor speed predicted upon coupling may be compared with the gear shifting time, and the engine may be turned on when the coupling time is earlier than the gear shifting time. In contrast, when the coupling time is later than the gear shifting time, since gear shift first occurs, the engine is not turned on and only the motor is driven, thereby improving fuel efficiency and operability.

Figure 6:
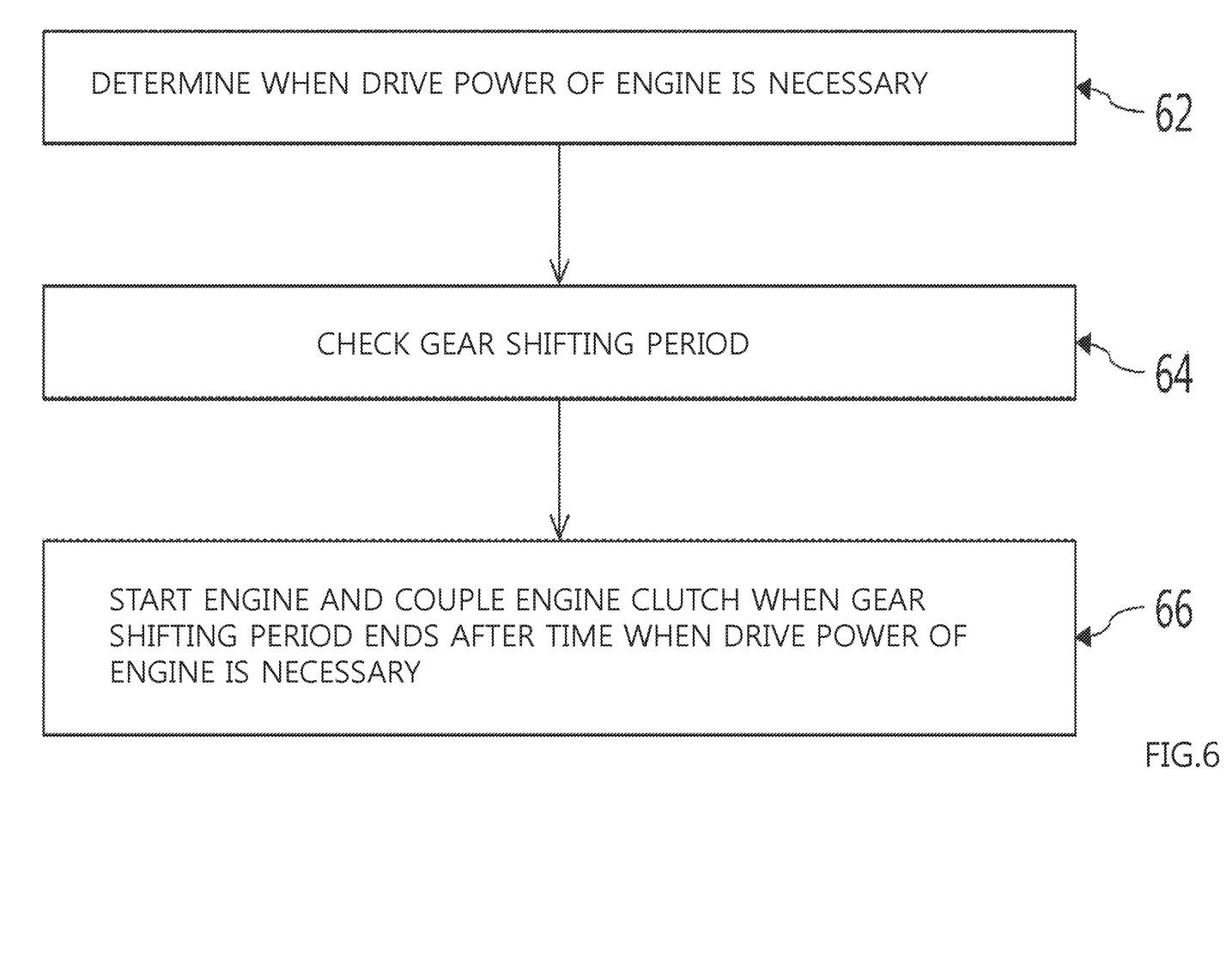
FIG. 6 is a flowchart illustrating a third method of controlling a powertrain in a hybrid vehicle.

FIG. 6 is a flowchart illustrating a third method of controlling a powertrain in a hybrid vehicle. As shown, the method of controlling the powertrain in the hybrid vehicle may include determining when the drive power of the engine is necessary at step 62, checking a gear shifting period at step 64, and starting the engine and coupling the engine clutch when a gear shifting period ends if necessary at step 66.

When the engine starts and coupling of the engine clutch is prepared when the drive power of the engine is necessary, fuel may be wasted while the hybrid vehicle performs gear shifting control. Accordingly, after determining that the drive power of the engine is necessary, the gear shifting period in which gear shifting control is performed needs to be checked to start the engine. Here, when the gear shifting period is checked, the gear shifting period of the traveling vehicle may be predicted using a gear shifting pattern map included in the gearshift of the vehicle or the gear shifting controller. When the gear shifting period of the vehicle is predicted through a predetermined gear shifting pattern map, the engine may start after the gear shifting period ends.

Figure 7:
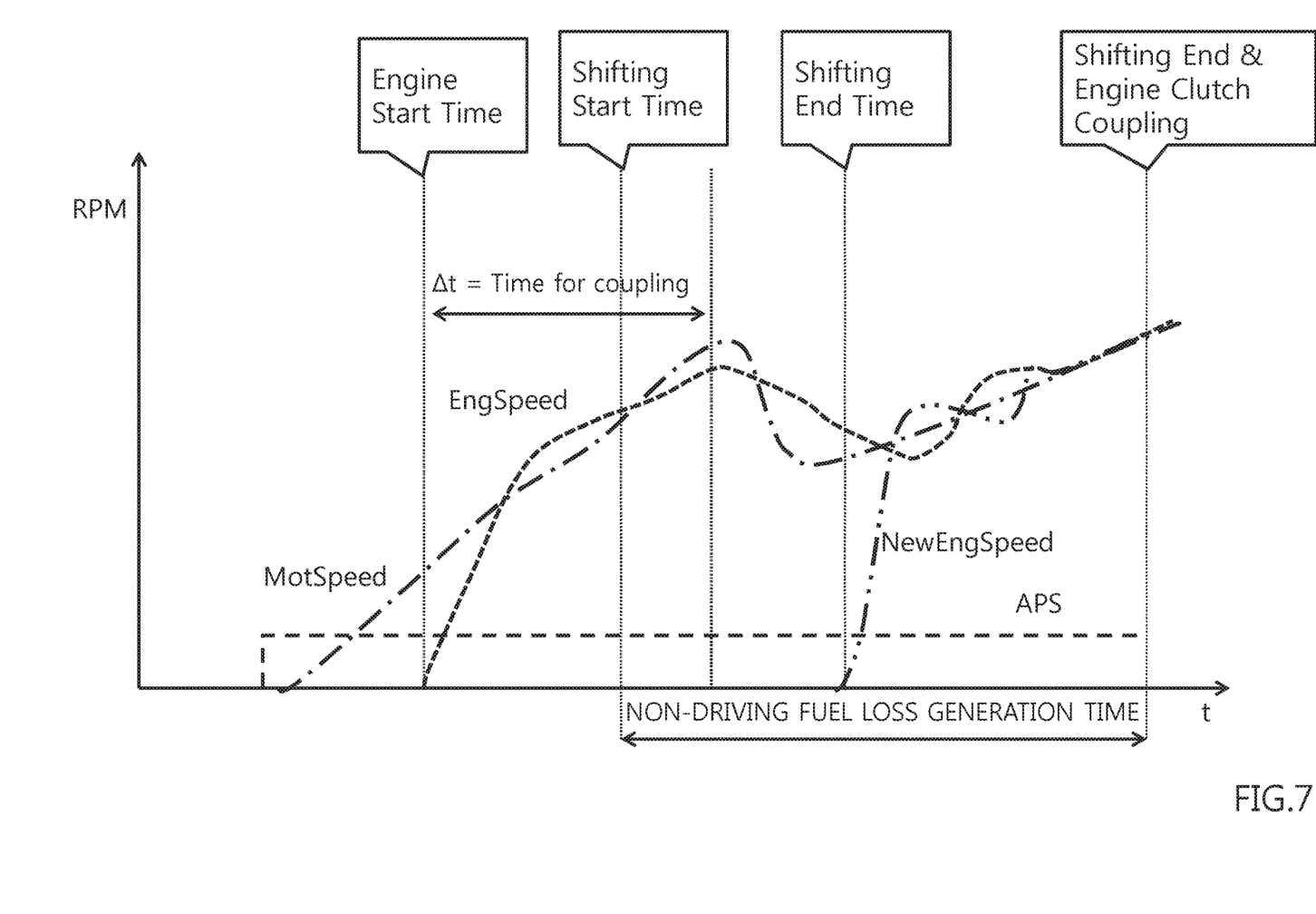
FIG. 7 is a diagram showing an example of adjusting an engine clutch coupling time in correspondence with a gear shifting time for improving fuel efficiency.

FIG. 7 is a diagram showing an example of adjusting an engine clutch coupling time in correspondence with a gear shifting time for improving fuel efficiency. More specifically, from comparison between FIGS. 1 and 7, it can be seen that a non-driving fuel loss generation period is reduced. Thus, fuel efficiency can be improved.

As shown, if it is assumed that the user or the driver presses the accelerator pedal such that output of the APS is constant, the drive motor may operate using electric energy stored in the hybrid vehicle (MotSpeed).

Thereafter, the case where the engine starts upon determining that the drive power of the engine is necessary as well as gear shifting control is performed when the engine clutch is coupled after a cranking period might cause the engine to unnecessarily start earlier (EngSpeed). The case where the engine starts without considering gear shifting control (EngSpeed) may be similar to the description of FIG. 1. After the engine starts and before the engine clutch is coupled, since the drive power of the engine is not used until gear shifting ends due to predicted gear shifting, fuel loss may occur. That is, until the engine clutch is coupled after engine start ends and gear shifting ends, the engine is turned on regardless of driving of the vehicle.

Meanwhile, according to the method of controlling the powertrain in the hybrid vehicle, before the engine starts, the start or coupling time of the engine and the predicted gear shifting time are compared and, if gear shifting is performed earlier than coupling, the hybrid vehicle is driven by electric energy without turning the engine on and then the engine starts after gear shifting ends, thereby reducing fuel loss (NewEngSpeed).

When the gear shifting time and gear shifting period of the hybrid vehicle are monitored to determine the start time of the engine, start of the engine may be prohibited due to gear shifting, thereby reducing fuel loss of the engine and thus improving fuel efficiency. That is, it is possible to prevent fuel from being wasted in order to follow a target coupling speed in a state in which the drive power of the engine is not used due to gear shifting. In addition, when coupling is impossible due to gear shifting, the hybrid vehicle is driven by electric energy in a state of turning the engine off (EV mode), thereby improving operability.

Figure 8:
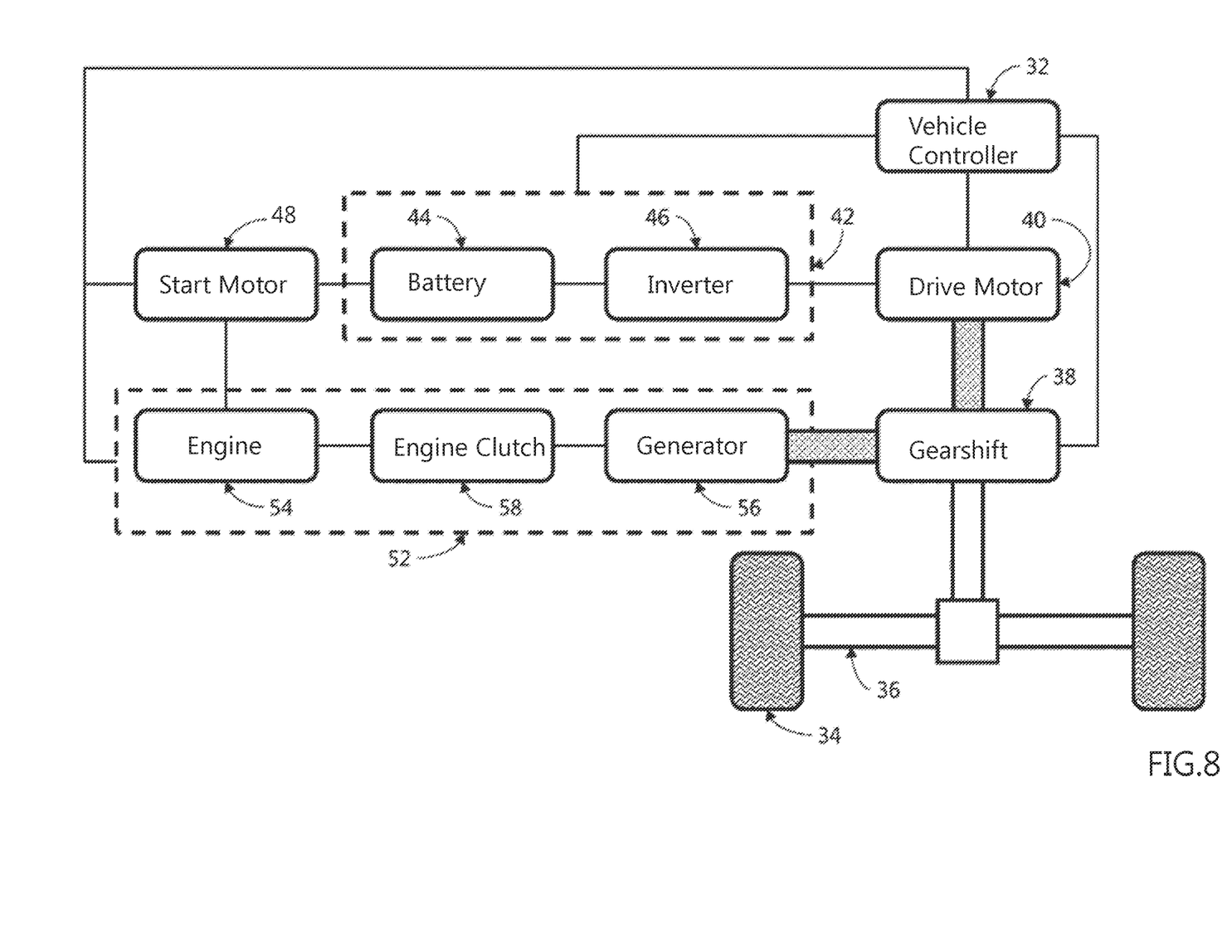
FIG. 8 is a diagram illustrating a hybrid vehicle for improving fuel efficiency.

FIG. 8 is a diagram illustrating a hybrid vehicle for improving fuel efficiency. As shown, the hybrid vehicle may include a gearshift 38 capable of adjusting kinematic energy applied to an axle 36 for connecting wheels 34, a drive motor 40 for supplying drive power to the gearshift, a second powertrain 42 for driving the drive motor using electric energy stored in a battery, a first powertrain 52 for driving the drive motor using fossil fuel, and a vehicle controller 32 for controlling the second powertrain 42 and the first powertrain 52 to be selectively connected to the drive motor 40. The vehicle controller 32 may couple the first powertrain 52 to the drive motor 40 when the gear shifting period of the gearshift 38 ends while the hybrid vehicle is driven using the second powertrain 42. In some embodiments, a generator 56 in the first powertrain 52 and the drive motor 40 may be coaxially connected.

The gear shifting period of the gearshift 38 may be from a gear shifting start time to a gear shifting end time predicted through a gear shifting pattern map having an automatic gear shifting pattern set while the vehicle travels. In some embodiments, the gear shifting pattern map having the automatic gear shifting pattern and a control module of the gearshift 38 may be included in the vehicle controller 32 or may be implemented as separate devices. For example, the gearshift 38 assists in efficiently using an engine torque according to vehicle traveling environment and condition change using several gears suitable for a high speed at a low speed. In particular, the gearshift 38 and the controller may select one of a plurality of patterns in consideration of various elements such as traveling environments, traveling states or driving/traveling patterns learned from the driver or the user.

The first powertrain 52 may include an engine 54, an engine clutch 58, and a generator 56. The elements of the first powertrain 52 may be included in a general vehicle other than the hybrid vehicle. In particular, the engine clutch 58 may selectively transfer drive power generated by the engine to the generator 56. The vehicle controller 32 may selectively transfer the drive power of the engine to the drive motor 40 under control of the engine clutch 58. Meanwhile, the engine 54 may not autonomously start and a starter motor 48 controlled by the vehicle controller 32 may start the engine 54.

The hybrid electric vehicle (HEV) may include a separate power source in addition to the first powertrain 52. For example, the second powertrain 42 may include a battery 44 and an inverter 46. Although not shown, the second powertrain 42 may include a battery and electric parts such as a battery control/management device, an inverter, a safety circuit, an electric cotter, and a rotation speed sensor (motor). The battery 44 may directly supply power when the vehicle travels and thus has excellent electricity storage capability. The battery 44 is different from a general battery in capacity and charging/discharging characteristics. Since a general lead storage battery is characterized in that electricity storage capacity is rapidly lowered upon complete discharging due to memory effects, a nickel-hydride battery having relatively excellent properties may be included. In addition, an electronic control unit (ECU) included in the battery 44 may sense the temperature and voltage of a vehicle battery system and control the charging state and the temperature based on the sensed data.

In addition, the inverter 46 may include a device (power inverter) for converting the DC voltage of the battery 44 into an AC voltage for the drive motor 40. For example, mass inverter technology of 50 kW or more is applicable to the HEV and the inverter 46 may be combined with a converter and a control unit.

Although not shown, the second powertrain 42 may include a regenerative braking system for driving a generator to charge the battery while the vehicle travels. The regenerative braking system may convert kinematic energy of an electric motor reversely rotating upon decelerating the vehicle into electric energy, store the electric energy in the battery and use the stored energy while the vehicle travels, thereby increasing energy efficiency.

The vehicle controller 32 may drive the drive motor 40 through the second powertrain 42 to recognize when the drive power of the engine is necessary while the vehicle travels. In this case, the vehicle controller 32 may compare the speed of the drive motor 40 with the predicted output of the engine 54 and determine start of the engine 54 and coupling of the engine clutch 58 according to the result of comparison. The predicted output of the engine 54 may be obtained by subtracting a speed increased until the coupling time from the predicted speed of the drive motor 40 at the coupling time of the engine clutch 58.

In some embodiments, the vehicle controller 32 may recognize when the drive power of the engine is necessary while the drive motor 40 is driven through the second powertrain 42 and then check the gear shifting period based on the automatic gear shifting pattern. The vehicle controller 32 may start the engine 54 and couple the engine clutch 58 when the gear shifting period of the gearshift 38 ends.

Meanwhile, in order to start the engine 54 and couple the engine clutch 58, the vehicle controller 32 may start the engine 54 when the gear shifting period ends, compare the output of the second gearshift 54 with the predicted output of the engine 54, and determine start of the engine 54 and coupling of the engine clutch 58 according to the result of comparison. Here, the drive power of the engine may be necessary when at least one of a state in which the charging state of the battery is less than a threshold, a discharge restriction state due to a low temperature or a state in which a manipulation value set in a power supply device exceeds a reference value is satisfied.

The above-described HEV generally includes an internal/external-combustion engine such as a gasoline or diesel engine and an electric motor and may be divided into a full hybrid vehicle and a mild hybrid vehicle according to the role of the electric motor. The full hybrid vehicle includes an engine, an electric motor or a combination thereof. Here, a full hybrid method refers to a method of driving a vehicle by the electric motor without consuming fuel upon startup, and low-speed driving and a mild hybrid method refers to a method of driving a vehicle using an internal/external-combustion engine in a normal state and using the electric motor only if additional power is necessary as in rapid acceleration.

In addition, the above-described HEV may be implemented using a serial method, a parallel method, or a combined method (serial/parallel combination). Here, the serial method refers to a method of driving a generator using an internal/external-combustion engine to charge a battery and driving a motor using electricity generated through the generator and the battery. In addition, the parallel method refers to a method of using an engine and an electric motor as a main power source and independently operating a drive shaft through a gearshift (transmission) connected to the engine and the electric motor for obtaining drive power from a storage battery. The combined method is obtained by combining the serial method and the parallel method.

According to the present disclosure, it is possible to improve fuel efficiency of a hybrid vehicle.

In addition, it is possible to prevent fuel loss of an engine to improve fuel efficiency by accurately predicting engine start prohibition due to gear shifting of a hybrid vehicle.

Furthermore, it is possible to improve operability by enabling a hybrid vehicle to be driven (by electric energy) in a state in which an engine is turned off (EV mode) when an engine clutch cannot be coupled due to gear shifting.

The effects of the present disclosure are not limited to the above-described effects and other effects which are not described herein may be derived by those skilled in the art from the description of the embodiments.

The present disclosure may be implemented as code that can be written to a computer-readable recording medium and can thus be read by a computer. Examples of the computer-readable recording medium include a hard disk drive (HDD), a solid state drive (SSD), a silicon disk drive (SDD), a ROM, a RAM, a CD-ROM, a magnetic tape, a floppy disk, and an optical data storage.

The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present disclosure pertains.

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

What is claimed is:

1. A method of controlling a powertrain in a hybrid vehicle, the method comprising:
   driving a drive motor through a power supply device using electric energy;
   recognizing when drive power of an engine is necessary;
   comparing a speed of the drive motor with a predicted output of the engine; and
   determining whether to start the engine and couple an engine clutch according to a result of the comparison;
   wherein predicted output of the engine is obtained by subtracting a first speed, which is actually increased until a coupling time, from a second speed of the driving motor, which is predicted at the coupling time of the engine clutch.

2. The method according to claim 1, wherein the hybrid vehicle includes at least one of a serial hybrid system, a parallel hybrid system, or a combined hybrid system mounted therein.

3. The method according to claim 1, wherein the power supply device operates while a travel speed of the vehicle is in a predetermined range after the vehicle starts up.

4. The method according to claim 3, wherein the power supply device includes:
   a battery configured to store electric energy; and
   a regenerative braking device configured to charge the battery.

5. The method according to claim 1, wherein the drive power of the engine is necessary when at least one of a state in which a charging state of a battery is less than a threshold, a discharge restriction state due to a low temperature, or a state in which a manipulation value set in a power supply device exceeds a reference value is satisfied.

6. The method according to claim 1, wherein a time when the drive power of the engine is necessary corresponds to output of an accelerator pedal sensor.

7. The method according to claim 1, further comprising:
predicting a gear shifting period according to an automatic gear shifting pattern; and
determining whether to start the engine and couple the engine clutch when the gear shifting period ends.

8. The method according to claim 7, wherein the predicting of the gear shifting period includes:
calculating a gear shifting start time and a gear shifting end time through a gear shifting pattern map having an automatic gear shifting pattern set while the vehicle travels.

9. A method of controlling a powertrain in a hybrid vehicle, the method comprising:
driving a drive motor through a power supply device including electric energy;
recognizing when drive power of an engine is necessary;
checking a gear shifting time based on an automatic gear shifting pattern; and
starting the engine and coupling an engine clutch when the gear shifting time ends;
wherein the starting of the engine and the coupling of the engine clutch includes:
starting the engine when the gear shifting time ends;
comparing a speed of the drive motor with predicted output of the engine; and
determining start of the engine and coupling of the engine clutch according to a result of the comparison,
wherein the predicted output of the engine is obtained by subtracting a first speed, which is actually increased until a coupling time, from a second speed of the driving motor, which is predicted at the coupling time of the engine clutch.

10. The method according to claim 9, wherein the drive power of the engine is necessary when at least one of a state in which a charging state of a battery is less than a threshold, a discharge restriction state due to a low temperature, or a state in which a manipulation value set in a power supply device exceeds a reference value is satisfied.

* * * * *